United States Patent Office 3,579,414
Patented May 18, 1971

3,579,414
POLYAMIDE CONJUGATE FILAMENT
Keizo Ueda, Nishinomiya, Tsuneo Ohkawahara, Hirakata, and Masao Matsui and Satoshi Ando, Osaka, Japan, assignors to Kanegafuchi Boseki Kabushiki Kaisha, Tokyo, Japan
No Drawing. Application Sept. 26, 1968, Ser. No. 768,956, now Patent No. 3,515,703, dated June 2, 1970, which is a continuation of application Ser. No. 368,691, May 19, 1964. Divided and this application Aug. 14, 1969, Ser. No. 871,232
Int. Cl. D02g 3/04
U.S. Cl. 161—173
2 Claims

ABSTRACT OF THE DISCLOSURE

A drawn nylon filament having superior heat durability, Young's modulus and dyeability which consists essentially of a copolyamide of undecamethylene terephthalamide and epsilon-caproamide, the latter being present in the range of from about 3 to 40% by weight of the copolyamide.

CROSS REFERENCE TO A RELATED APPLICATION

This application is a division of application, Ser. No. 768,956, filed Sept. 26, 1968, now U.S. Pat. No. 3,515,703, which in turn is a continuation of Ser. No. 368,691, filed May 19, 1964, now abandoned.

This invention relates to synthetic linear polycarbonamides and, more particularly, to a copolyamide of poly(undecamethylene terephthalamide) which, when spun and otherwise processed in a conventional manner, yields fabrics having a unique combination of superior heat durability, high Young's modulus and excellent dyeability as compared with fabrics produced from a 6-nylon homopolymer.

The known conventional synthetic polyamide filaments, such as 6-nylon, can not be said to be sufficient in Young's modulus and heat durability. Various aromatic polyamides have been suggested with a view to improving these properties but no satisfactory results have yet been obtained. Specifically the aromatic polyamide obtained from an aliphatic diamine and terephthalic acid has excellent properties but its melting point is so high that it is difficult to adopt the ordinary systems of heating polymerization and melt-spinning in its polymerizing and spinning steps.

Usually the aromatic polyamide is so rigid in the structure of the molecular chain and has such a high viscosity when molten that, in obtaining a polyamide of a desirable degree of polymerization by heating and condensing it, it is difficult to remove water and alcohol produced with the progress of the condensation reaction and it is often impossible to carry out the condensation reaction. That is to say, in the heating condensation, in order to efficiently obtain a polyamide of a high degree of polymerization, there is used a means of reducing the molten viscosity by heating to a high temperature. However, at such high temperature, the molecular chain will be broken and decomposed and only a polyamide of a low practicability and low degree of polymerization will be obtained. For example, a polyamide composed of an aliphatic diamine having 10 or less carbon atoms and terephthalic acid has such a high melting point that, if the heating temperature is elevated in the polymerizing and melt-spinning steps, it will be thermodecomposed and no product having a fiber forming ability will be obtained. An aliphatic diamine having 12 carbon atoms also has such a high melting point that it can not be melt-spun. Further, with an aliphatic diamine having 13 or more carbon atoms, the greater the number of carbon atoms, the greater the ease of polymerization and spinning but, contrary to the former, the melting point will be so low that the heat durability of the filaments obtained from the diamine will also be reduced to such an extent that the fiber products made therefrom cannot be ironed.

The present invention has been made to eliminate such defects as are described above. Filaments of such excellent properties as are described later can be obtained by the ordinary heating polymerization and melt-spinning of the polyamide disclosed here.

As a result of making various researches to obtain polymers which have a reduced viscosity at the time of the above mentioned condensation reaction and which have excellent properties, we have arrived at the present invention and have discovered that for the aliphatic diamine which is the raw material of the polyamide, it is preferable to use an aliphatic diamine having 11 carbon atoms. Specifically we have confirmed that a polycondensate of 1,11-diaminoundecane and terephthalic acid shows the best results as a raw material for making synthetic fibers. However, when it is subjected to the normally industrially practiced heating polycondensation system, it is still insufficient in respect of thermostability.

By copolycondensing a proper amount of $\epsilon$-caprolactam with the above mentioned polycondensate to improve these points, we have succeeded in obtaining a polyamide of a specifically favorable molten viscosity. That is to say, the polyamide as such is an aromatic polyamide composition obtained by copolycondensing less than 40% by weight of $\epsilon$-caprolactam with a condensation composition of 1,11-diaminoundecane with terephthalic acid, crude phthalic acid containing less than 10% by mol isophthalic acid or its ester.

It is already known to copolymerize various raw materials of a polyamide to obtain thermostability by merely reducing the melting point of the polymer. However, specifically in order to improve the thermostability of a raw material polymer for synthetic fibers without reducing the feature as of an aromatic polyamide, the obstruction to the crystallizability due to the length of the molecule must be considered. In this respect, the aromatic polyamide obtained by the copolymerization of undecamethylene diammonium terephthalate and $\epsilon$-caprolactam can well attain the object.

For the polymerization of the above mentioned aromatic polyamide, a proper viscosity stabilizer may be added to a mixture of salts or a mixture of substantially equal mols of 1,11-diaminoundecane and terephthalic acid or a mixture of equal mols of 1,11-diaminoundecane and terephthalic acid ester with less than 40% but more than 3% by weight $\epsilon$-caprolactam or polycapramide which is its polymer in the total condensation composition and the mixture may be heated in an inert gas current, such as nitrogen gas or carbon dioxide, as required, under superatmospheric pressure until the mixture comes to have a melt-spinnable intrinsic viscosity. It is also effective to use a solvent, such as phenol or cresol. In such case, it is effective to remove such solvent by reducing the pressure to deform it in the ending period of the polymerization. The heating temperature is usually 200 to 300° C. The heating time is 2 to 20 hours or preferably 3 to 8 hours at 250 to 320° C.

Any polycondensation composition thus otained has a high aromatic ring and yet is so high in fluidity and viscosity stability as melted that the heating polymerizing operation is easy and, even by heating under atmospheric pressure, a high degree of polymerization can be obtained. Therefore, a polyamide of a required high degree of polymerization can be obtained not only by batch polycondensation but also by continuous polycondensation under atmospheric pressure with a VK tube.

In the following table are shown relations between the intrinsic viscosity and reaction time of a polyamide in the case in which 25 wt. percent ε-caprolactam was added to 75 wt. percent undecamethylene diammonium terephthalate and the mixture was heated to be condensed under atmospheric pressure in a nitrogen gas current.

|  | Reaction time (hours) | Intrinsic viscosity (percent) |
|---|---|---|
| Reaction temperature (° C.): |  |  |
| 270 | 2 | 0.77 |
| 270 | 4 | 0.82 |
| 270 | 6 | 0.84 |
| 270 | 8 | 0.84 |

It is needless to say that the addition of a viscosity stabilizer in the polycondensing step is very important to the production of a polyamide having an aromatic ring. A polyamide of a very high degree of polymerization can be obtained within a short time. Usually a polymer of an intrinsic viscosity of 0.6 to 1.1 is preferable in practice and for the polymerizing operation, because the fibers and plastics obtained from a condensate of an intrinsic viscosity of less than 0.6 has only a low strength and is very low in practical value and very tough films can be obtained from a polycondensate of an intrinsic viscosity of more than 1.1 but the fluidity in the polycondensing and spinning steps in so low that defoaming is difficult.

For the viscosity stabilizer it is effective to use such monocarboxylic acids and dicarboxylic acids as, for example, terephthalic acid, acetic acid, benzoic acid and stearic acid. The amount of them that is added is different depending on the use of the polyamide resin but it is proper to add them at a rate of 1/50 to 1/600 mol per mol of the total condensation material composition. Usually 1/100 to 1/300 mol is specifically preferable. A part or all of each of the 1,11-diaminoundecane and terephthalic acid can be used also as its salt. Further, a part or all of the terephthalic acid can be used as a methyl or ethyl ester. In such case, a methyl or ethyl radical will be separated in the form of methanol or ethanol during the polycondensation.

In order to attain the object of the present invention, it is necessary that the content of ε-caprolactam or polycapramide in the total condensation composition should be less than 40 percent by weight but more than 3 percent by weight. When the content of undecamethylene diammonium terephthalate is lower than that, there will be obtained no polyamide resin which can become a raw material for making synthetic fibers high in Young's modulus and heat durability. Further, if the content of undecamethylene diammonium terephthalate is higher than that, the heating polymerizing operation will be very difficult.

In the following table are shown raw material compositions in the copolycondensation of undecamethylene terephthalate and ε-caprolactam and the melting points of copolycondensed polyamides obtained from them.

| Undecamethylene diammonium terephthalate | Percent by weight ε-Caprolactam | Melting point (° C.) |
|---|---|---|
| 97 | 3 | 270 |
| 93 | 7 | 264 |
| 88 | 12 | 257 |
| 82 | 18 | 240 |
| 76 | 24 | 235 |

The polyamide suitable for the present invention has a favorable thread spinnability and drawability and is therefore most suitable as a raw material of fibers. The contents therein of such hot-water-soluble elements which are usually present as mixed in polyamide resins and must be extracted and removed with hot water as monomers and oligomers are so low that, even by directly melt-spinning the polymer obtained by heating and condensing the polyamide resin of the present invention, polyamide fibers having excellent characteristics can be obtained. Further, the polyamide resin of the present invention has such high resistance to hot water that, even when it is used not only for fibers but also for such plastic materials as gears, rollers and pipes, it will show excellent properties. It is specificlaly adapted to be used for such things as are to be placed in contact with hot water containing oxygen for a long time or are continuously used at a high temperature.

In producing filaments of the present invention from the above described polyamide resin, said resin is melt-spun and then elongated and is, as required, heat-treated. Usually, in case a resin obtained by heating and polycondensing undecamethylene diammonium terephthalate is melt-spun and elongated, the obtained thread will be so brittle that, when it is subjected to impact or is wound on a winder, it will often break and the efficiency of the operation will be reduced. This is because of the lack of the degree of polymerization and the low fluidity in the molten state in addition to the intrinsic brittleness of the polymer. In this respect, the polyamide resin obtained by copolymerizing ε-caprolactam with undecamethylene diammonium terephthalate is so high in thread spinnability, drawability and viscosity stability that the melt-spinning operation can be carried out efficiently.

The filaments obtained from the copolymer of polyundecamethylene terephthalamide and polyepsilon caproamide have a Young's modulus and heat durability far higher than those of conventional synthetic homopolyamide filaments, such as 6-nylon filaments, and are high in dyeability. They can be easily dyed to a deep color in a dyeing bath under atmospheric pressure. Having both a high Young's modulus and dyeability is one of the features not seen in conventional synthetic polyamide polyester fibers. Together with the high heat durability, the fibers of the present invention can be used for a wide range of uses, such as for clothes, tire cords and other industrial purposes.

Further, when the copolyamide resin is subjected to conjugate-spinning wherein two different separately melted polymers are simultaneously spun through the same nozzle orifice to form a unitary composite filament, polyamide composite filaments of excellent properties will be obtained. In the above mentioned conjugate-spinning, it is necessary that the two kinds of polymers should be different in the characteristics of thermocontraction or elastic contraction and should at the same time have a favorable conjugatability. Thereby it is possible to obtain favorable composite filaments which are capable of developing excellent and stable crimps and which neither peel nor cleave. As the object of producing crimped fibers is to obtain fibers high in bulkiness, not only the crimpability must be high but also the fibers themselves must be high in elasticity. That is to say, it is necessary that the Young's modulus and elastic recovery of the crimped fibers should be high. We have succeeded in producing various excellent crimped filaments having Young's modulus and heat durability higher than those of conventional composite filaments of this kind by spinning the above described polyamide resin and a known polyamide or specifically polycaprolactam as conjugated.

That is to say, of the two polymers to be conjugated in the present invention, one is 6-nylon and the other is a polymer obtained by copolymerizing ε-caprolactam with 1,11-diaminoundecane and terephthalic acid or its ester, The content of 1,11-diaminoundecane and terephthalic acid is 60 to 97% by weight of the condensation composition consisting of undecamethylene diammonium terephthalate and ε-caprolactam. They are to be spun at a conjugating ratio of 1:10 to 10:1. Further, when the two polymers to be conjungated are such as the following, crimped filaments of the more excellent performances than those mentioned above will be obtained.

That is to say, the proportion of the unit

CO—C₆H₄—CO derived from terephthalic acid contained in the polymer is 27 to 37% by weight and the conjugation ratio ranges between 1:5 to 5:1.

In spinning them, the copolymerized polyamide of the above mentioned composition and 6-nylon obtained by the normal process are separately heated to be melted, the respective melts are delivered at the above mentioned conjugating ratio by means of a gear pump connected to the melting part, are simultaneously spun through the same nozzle so as to be conjugated and are wound up as a single fiber and the fiber is elongated. The elongated fibers as they are have a high crimpability if they are further treated with steam, hot water or hot air, they will develop excellent crimps.

As described above, the crimped polyamide filaments obtained by the present invention are high in conjugatability and are much higher in elasticity and bulkiness than conventional nylon yarns. Further, the higher the content of polyundecamethylene terephthalamide in the above described copolymer composition, the higher the tendency of producing compact crimps. Therefore, there is an advantage that expected crimped filaments can be freely obtained by increasing or decreasing the contents of the above mentioned constituents in the range of the conjugating ratio according to the specific uses.

To make the present invention more clear, examples are given in the following:

EXAMPLE 1

1 mol of 1,11-diaminoundecane was heated to be dissolved in 200 ml. of distilled water. 1 mol of terephthalic acid was added thereto. The mixture was heated while being stirred. When the mixture was cooled, a white sale was deposited. This salt had a melting point of 251.5 to 252° C.

When 350 parts of this salt were heated in a carbon dioxide gas current at 290° C. for 2 hours and further at 310° C. for 4 hours and were then cooled, a slightly yellow nontransparent mass was obtained.

It had a melting point of 279° C. and an intrinsic viscosity of 0.79. 100 parts of ε-caprolactam and 50 parts of distilled water were heated in a nitrogen gas current in an autoclave for 2 hours and were then cooled. 12 parts of an initial polymer of ε-caprolactam obtained by drying the contents were added to the above mentioned mass. The mixture was heated and stirred at 310° C. for 2 hours. The yarn obtained by melt-spinning the mixture and elongated to 4.5 times as long had a strength of 5.2 g./d., elongation of 33% and Young's modulus of 57 g./d. In case this fiber was left standing in air at 200° C. for 4 hours, the reduction of the strength was only 12%.

In case this fiber was soaked at 95° C. for 45 minutes in a dyeing bath of a pH of 4 containing 1.0% Alizarin Blue to the fiber, the dye adsorbing rate was 94%.

EXAMPLE 2

1.01 mol of 1,11-diaminoundecane and 1 mol of terephthalic acid dimethyl ester were heated with 300 ml. of distilled water for 4 hours in a vessel provided with a reflux condenser. The mixture was then cooled and a white nylon salt was deposited.

To 85 parts of the obtained nylon salt and 15 parts of ε-caprolactam was added 40 parts of distilled water and further acetic acid in an amount of 2 mol to the total condensate, and the mixture thus obtained was heated at 290° C. for 4 hours in a nitrogen gas current. After that, it was defoamed for 10 minutes under a reduced pressure of 10 mm. Hg. It was then extruded and cut to obtain polymer chips. They had a melting point of 251° C. and intrinsic viscosity of 0.87. The fiber obtained from them had a strength of 5.6 g./d. and Young's modulus of 5 g./d., and was excellent in heat durability.

EXAMPLE 3

1.01 mol of 1,11-diaminoundecane and 1 mol of terephthalic acid were heated to be dissolved in 250 ml. of distilled water. 0.5 part of phosphoric acid was added thereto. The mixture was heated at 290° C. for 1 hour in a nitrogen gas current in an autoclave and then the pressure was gradually released. Then 0.19 mol of ε-caprolactam was added to the mixture. The mixture was heated at 300° C. for 35 hours in a nitrogen gas current under atmospheric pressure and further for 2 hours under a reduced pressure of 8 mm. Hg. When it was cooled, a white nontransparent mass was obtained.

It had a melting point of 264° C. and intrinsic viscosity of 0.92 and contained only 1.4% hot-water-soluble element. The fiber obtained by melt-spinning it and then elongating it to be 5 times as long had a strength of 5.8 g./d., elongation of 25%, Young's modulus of 52 g./d. and yield point stress of 1.2 g.d.

This fiber could well absorb an acid dye from an acid dyeing bath at 90° C. and could be dyed to a deep color.

EXAMPLE 4

A mixture of 1 mol of 1,11-diaminoundecane, 1 mol of terephthalic acid and 15 g. of ε-caprolactam was heated at 180° C. for 1 hour in a nitrogen gas current and was then heated at 290° C. for 6 hours by gradually elevating the temperature. When it was then heated at 300° C. for 2 hours under a reduced pressure of 20 mm. Hg and was cooled, a white transparent mass was obtained. It had a melting point of 269° C. and an intrinsic viscosity of 0.88. It was hard to dissolve while hot in such solvents as ethylene glycol propylene glycol, methanol and 85% formic acid.

In case it was heated to be melted in an oil bath at 290° C., its fluidity was favorable. Fibers could be efficiently obtained by melt-spinning it. The elongated yarn obtained by hot-elongating it to be 3.5 times as long at 120° C. had a Young's modulus of 47 g./d.

The thermobreaking temperature of this fiber under a load of 2.5 g./d. was 240° C.

After the fiber was soaked in hot water containing oxygen at 100° C. for 3 weeks, the loss of strength was only 11%.

EXAMPLE 5

When 186 parts of 1,11-diaminoundecane and 166 parts of crude terephthalic acid containing 8.2 wt. percent isophthalic acid were heated to be dissolved together with 400 parts of distilled water and were then cooled, a white salt was deposited. It had a melting point of 239 to 244° C.

32 parts of ε-caprolactam were added to 350 parts of this salt. The mixture was heated at 280° C. for 8 hours in a nitrogen gas current, was then directly melt-spun and was elongated to be 3.7 times as long. The thus obtained elongated yarn had a Young's modulus of 46 g./d.

EXAMPLE 6

186 parts of 1,11 - diaminoundecane were heated together with 166 parts of terephthalic acid and 250 parts of distilled water at 300° C. for 4 hours in a nitrogen gas current. 25 parts of an initial polymer of ε-caprolactam obtained in the same manner as in Example 1 were then added and the mixture was heated and stirred at 300° C. for 1 hour and was left standing to be defoamed for 40 minutes. When the mixture was melt-spun, the fluidity of the polymer in the molten state was favorable, the rotating velocity of the winder could be increased and the efficiency was high. When the thus obtained fiber was further cold-elongated to be 4.5 times as long, a fiber having a Young's modulus of 49 g./d. was obtained. Further, the fabric made of such fibers was well ironed at a high temperature without causing any recognizable shrinking or melting.

EXAMPLE 7

A mixture of 90 parts of a salt obtained in the same manner as in Example 1 from 1,11 - diaminoundecane and terephthalic acid and 10 parts of ε-caprolactam was continuously heated to be condensed for 9 hours in a nitrogen gas current while being fed into the upper part of a polymerizing tower heated to 300° C. The polymer was delivered out of the lower part of the tower by means of a gear pump and was melt-spun. When the thus obtained fiber was elongated to be 4.2 times as long, a fiber having a strength of 4.7 g./d., elongation of 42% and Young's modulus of 43 g./d. was obtained very efficiently.

EXAMPLE 8

7 parts of 1,11-undecamethylene diamine and terephthalic acid salt and 3 parts of ε-caprolactam were mixed together and were heated to be polymerized at 250° C. for 6 hours in a carbon dioxide gas current. The thus obtained polymer and 6-nylon were conjugate-spun at a conjugating ratio of 1:1 by weight. The fiber was then elongated at room temperature to be 4.5 times as long. The properties of the thus obtained fiber were as follows:

Fineness: 14.6 deniers.
Strength: 4.7 g./d.
Elongation: 31.2%
Young's modulus: 28.7 g./d.
Number of crimps: 31.3/inch.
Crimped proportion: 46.1%
Elastic recovery of crimp: 87.5%

The properties of the fiber obtained by further heat-treating the above mentioned fiber with steam in a tensionless state were as follows:

Fineness: 16.3 deniers.
Strength: 4.3 g./d.
Elongation: 39.2%
Young's modulus: 29.3 g./d.
Number of crimps: 32.9/inch.
Crimped proportion: 88%
Elastic recovery of crimps: 87.2%

EXAMPLE 9

75 parts of 1,11-undecamethylene diamine and terephthalic acid salt and 25 parts of ε-caprolactam were mixed together and were heated to be polycondensed at 270° C. for 6 hours in a carbon dioxide gas current. The thus obtained polymer and 6-nylon were conjugate-spun at a conjugating ratio of 1:1. The obtained fiber was elongated at 70° C. to be 4.6 times as long, was then contracted in air at 100° C. and was further treated in hot water. The performances of the thus obtained crimped yarn as compared with those shown by a woolly 6-nylon yarn treated in the same manner were as follows: The apparent elastic recovery of the woolly yarn is shown to be higher because the crimps were lost and the elongation of crimp reduced.

|  | Present sample | Woolly yarn |
|---|---|---|
| Elongation of crimp, percent | 221 | 72 |
| Apparent elastic recovery of crimp, g./d | 0.0027 | 0.0044 |
| Initial modulus, g./d | 17.3 | 11.0 |

The embodiments of the invention, in which an exclusive property or privilege is claimed, are defined as follows:

1. A drawn nylon filament having superior heat durability, Young's modulus, dyeability and crimpability consisting essentially of two continuous adhered components, one of said components consisting essentially of a poly-epsilon-caproamide, the other component consisting essentially of a copolyamide of undecamethylene terephthalamide and epsilon-caproamide, there being about 3 to 40% by weight of the epsilon-caproamide in the copolyamide.

2. The filament of claim 1, wherein these units
$$CO-C_6H_4-CO$$
contained in the terephthalamide are present in the range of from 27 to 37% by weight of the copolyamide.

References Cited
UNITED STATES PATENTS

| 3,145,133 | 8/1964 | Barton | 161—173 |
| 3,216,965 | 11/1965 | Cipriani | 260—857 |
| 3,259,606 | 7/1966 | Okada | 260—78L |

WILLIAM J. VAN BALEN, Primary Examiner

LINDA M. CARLIN, Assistant Examiner

U.S. Cl. X.R.

161—177; 260—78; 264—171, 210